United States Patent
Sliger

[11] Patent Number: 5,910,093
[45] Date of Patent: Jun. 8, 1999

[54] STARTER TUBE FOR USE IN VITRIFICATION PROCESS

[76] Inventor: William A. Sliger, 3506 W. Third, Kennewick, Wash. 99336

[21] Appl. No.: 08/759,176

[22] Filed: Dec. 4, 1996

Related U.S. Application Data

[62] Division of application No. 08/363,259, Dec. 23, 1994, abandoned.

[51] Int. Cl.$^6$ ....................................................... B09C 3/00
[52] U.S. Cl. .......................... 588/253; 166/248; 405/128; 405/131
[58] Field of Search ............................. 166/248; 299/14; 405/128, 130, 131; 588/11, 252, 253, 900

[56] References Cited

U.S. PATENT DOCUMENTS

| | | | |
|---|---|---|---|
| 3,137,347 | 6/1964 | Parker | 166/248 |
| 3,970,488 | 7/1976 | Nelson | 174/11 R |
| 4,376,598 | 3/1983 | Brouns et al. | 405/258 |
| 4,762,991 | 8/1988 | Timmerman et al. | 250/227 |
| 5,004,373 | 4/1991 | Carter | 405/131 |
| 5,024,556 | 6/1991 | Timmerman | 405/128 |
| 5,114,277 | 5/1992 | Murphy et al. | 405/231 |
| 5,341,128 | 8/1994 | Keyser | 425/108 |
| 5,626,249 | 5/1997 | Tylko | 588/900 X |
| 5,643,350 | 7/1997 | Mason et al. | 588/900 X |

*Primary Examiner*—George Suchfield

[57] ABSTRACT

The invention disclosed here is a starter tube for initiating a vitrification process for melting contaminated soils, waste products, and hazardous materials. The starter tube comprises a tubular sheath made of a flexible material. Received within the sheath is an electrically conductive starter material. The sheath is gas-permeable so that gases created by the starter material during commencement of vitrification will escape from the tube.

2 Claims, 4 Drawing Sheets

STARTER TUBE FOR USE IN VITRIFICATION PROCESS

This application is a division of application Ser. No. 08/363,259, filed Dec. 23, 1994, now abandoned.

TECHNICAL FIELD

This invention relates to methods of vitrifying contaminated soils, waste products, and other materials amenable to treatment by vitrification processes. More particularly, it relates to a method of creating an electrically conductive path between electrodes for initiating a vitrification procedure.

BACKGROUND OF THE INVENTION

The vitrification of contaminated soils and other waste products (collectively "waste materials") can be accomplished by passing an electric current between spaced-apart electrodes which may be surrounded by the waste materials. Normally, the waste materials cannot adequately conduct electricity to initiate melting during the vitrification process. It is therefore necessary to create an electrically conductive path between the electrodes in order to start the process. The electric current transmitted along the path generates heat, which melts the waste materials. The conductivity of the melted waste materials is higher than when unmelted and is sufficient to carry the current as vitrification continues.

Initially, only the waste materials immediately surrounding the path will melt. However, as the waste materials become more conductive upon melting, they generate the heat for further vitrification which is transmitted to the surrounding unmelted materials and causes the zone of vitrification to gradually enlarge. This continues until the waste materials between and about the electrodes have completely melted. At that point, application of the electric current is terminated, and the molten materials are allowed to cool and solidify. The result is a mass of stable glass or glassy material in a vitreous and crystalline form. This method is particularly useful in connection with stabilizing or immobilizing hazardous materials (e.g., hazardous non-radioactive wastes, radioactive materials, or mixed) which have been or will be buried in the ground. The same kind of method can be performed above the ground in melting containers or other above-ground staging areas.

The electrically conductive path needed between the electrodes can be created in a number of different ways. The conventional way is to create a vein consisting of a graphite-glass frit mixture ("starter material") that electrically interconnects the electrodes. The starter material is sufficiently conductive to initiate the vitrification process and is subsequently consumed during vitrification.

To date, the predominant commercial application of large-scale vitrification technology for treatment of contaminated soils and waste materials has been the in-situ vitrification ("ISV") process. ISV involves digging shallow ground trenches between electrode positions of an ISV machine for defining a starter material channel. As an example, sometimes conventional two-by-six inch boards are placed along opposite sidewalls of individual trenches to hold the starter material in place and to define a vein of uniform cross-section. This is schematically illustrated in FIG. 7, which is labelled "prior art."

FIG. 7 is a cross-sectional view of a trench extending between the electrodes of a conventional ISV machine. After two two-by-six boards 1, 3 are arranged in the trench 7, and the starter material 5 is poured between the boards, the boards are subsequently removed. The starter material 5 is then covered with a few inches of clean soil (although sometimes the waste material itself is used) and the vitrification process commences.

The problem with the prior art arrangement shown in FIG. 7 is that it is labor intensive and creates problems with respect to creating a uniform vein of starter material. Currently, ISV machines have a large hood which covers the area to be vitrified. The hood carries the electrodes and locates them relative to the vitrification site. Placement of the hood is usually the first step in the vitrification process. Thereafter, the electrodes are positioned and one or more trenches between electrode positions are dug by workmen underneath the hood. The forms and starter material are then passed to the workmen for placement and burial.

The invention disclosed and claimed here provides a more efficient way to place the starter material prior to vitrification. How the invention accomplishes this is described below.

SUMMARY OF THE INVENTION

The invention is a starter tube for creating an electrically conductive path in connection with a vitrification process. The starter tube comprises an elongated tubular sheath made of a gas-permeable material. A gauze fabric would be suitable for use as the sheath. In some cases, it may not be necessary to use a material that is gas-permeable. Nevertheless, received within the sheath is a starter material, preferably in the form of a graphite-glass frit mixture. The sheath retains the starter material and shapes it into a flexible electrical conductor.

In use, the starter tube is positioned between at least one pair of electrodes in an ISV machine or between electrodes used in other vitrification processes. The tube is constructed well before the vitrification process and may be made of many different lengths. When put into use, a single tube is cut to length, and each end of the tube is placed near or in contact with a separate electrode. Additional starter material may be poured or allowed to flow around each end of the tube, so that starter material will at least partially surround the adjacent electrode, to ensure that there will be good electrical conductivity between electrode and tube. Prior to being used, the ends of the tube are closed by any suitable means, including sewing or tying.

When used in conjunction with an ISV machine, it is typical to dig a shallow trench between electrode pairs in the machine. The tube is cut to a length corresponding to the distance between electrodes and placed in the bottom of the trench. This is followed by covering the tube with a layer of clean soil or, sometimes, waste material which is to be vitrified. The starter material generates gases during the commencement of vitrification. These easily pass through the sheath, because of its permeability. A more detailed description of the starter tube is set forth below.

BRIEF DESCRIPTION OF THE DRAWINGS

In the drawings, like reference numerals and letters refer to like parts throughout the various views, and wherein.

BEST MODE FOR CARRYING OUT THE INVENTION

Figure 1:
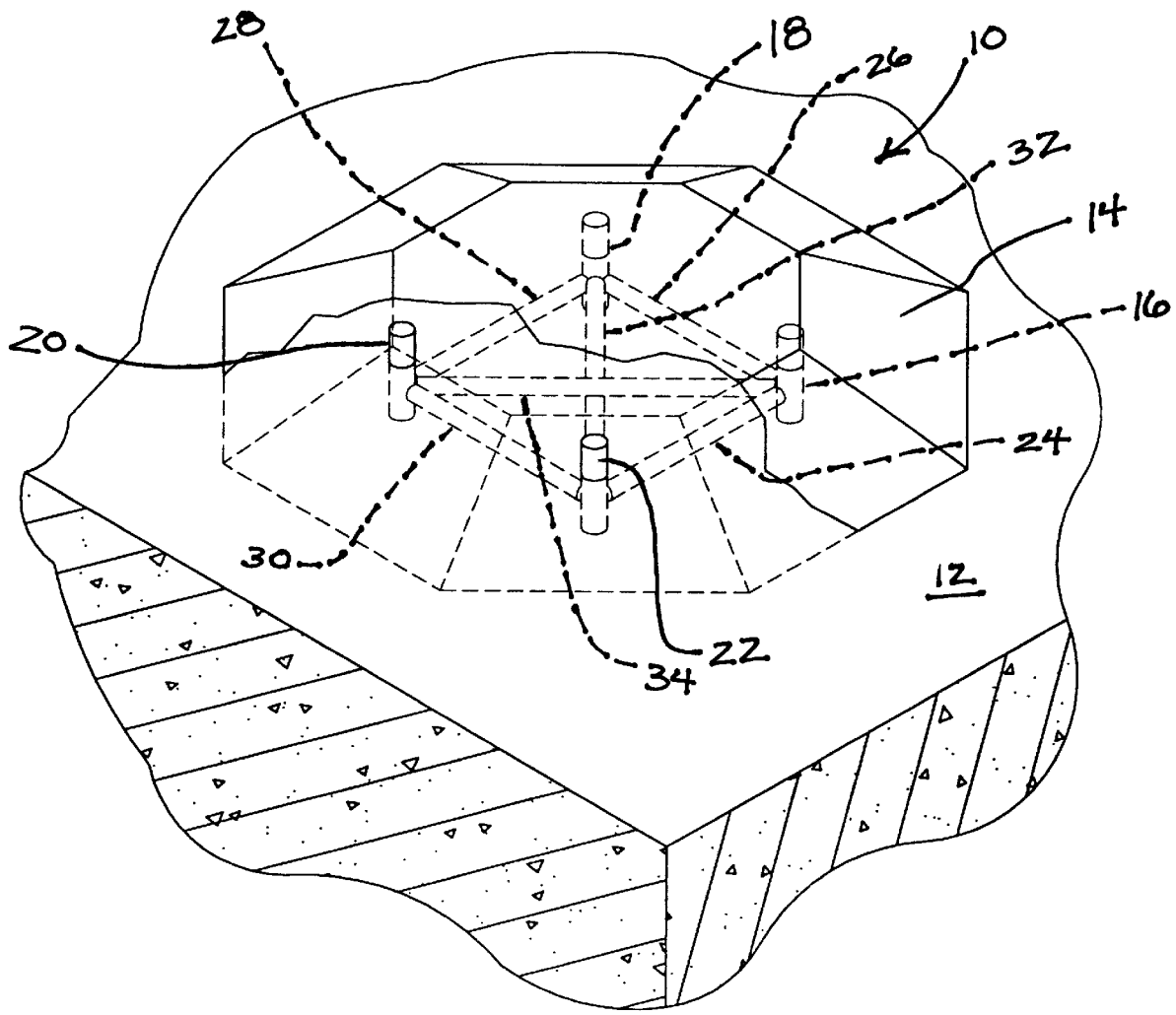
FIG. 1 is a pictorial view of the electrode-holding portion of an ISV machine and shows the machine positioned over an area that is to be vitrified.

Referring first to FIG. 1, shown generally at 10 is the electrode-holding portion of a typical ISV machine positioned over a portion of a contaminated soil site 12. The machine 10 has a hood 14 and four electrodes 16, 18, 20, 22. Generally speaking, the machine 10 is similar in construction to the ISV machine disclosed in U.S. Pat. No. 4,376, 598, which issued to Richard A. Brouns and James L. Buelt on Mar. 15, 1983. The various features and operational details of that machine are incorporated here by reference.

Figure 2:
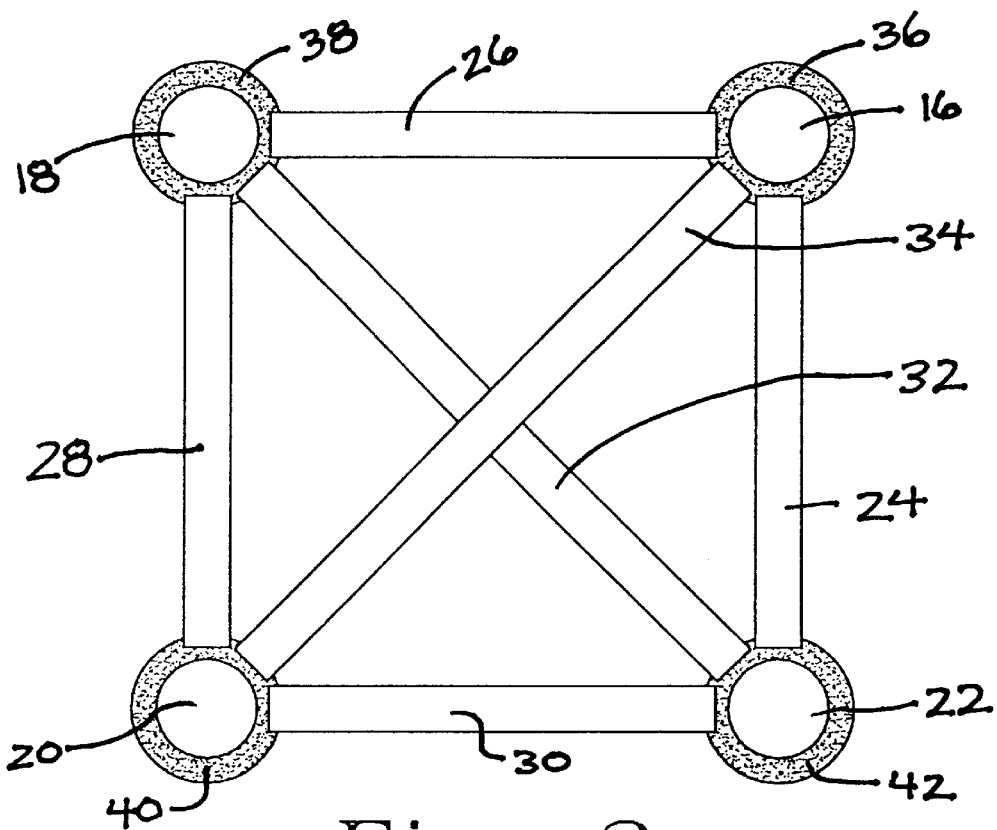
FIG. 2 is a top plan view of an arrangement of starter tubes constructed in accordance with the invention, the arrangement defining various electrically conductive paths between the electrodes of the ISV machine shown in FIG. 1.

A plurality of buried starter tubes 24, 26, 28, 30, 32, 34, constructed in accordance with the invention, are shown in dashed lines in FIG. 1. A top plan view of the starter tubes 24, 26, 28, 30, 32, 34 is shown in FIG. 2. Tubes 32, 34 criss-cross, with the central region of tube 34 overlying tube 32. It may be preferable to cut the tubes 32, 34 at their respective center points in order to allow the starter material held inside each one to mix together.

Each electrode 16, 18, 20, 22 is surrounded by a region of starter material, indicated at 36, 38, 40, 42, respectively, for electrically connecting the various ends of the starter tubes 24, 26, 28, 30, 32, 34 to the electrodes. This arrangement is also shown in FIG. 3, which is a side elevation of electrodes, 16, 22.

Figure 3:
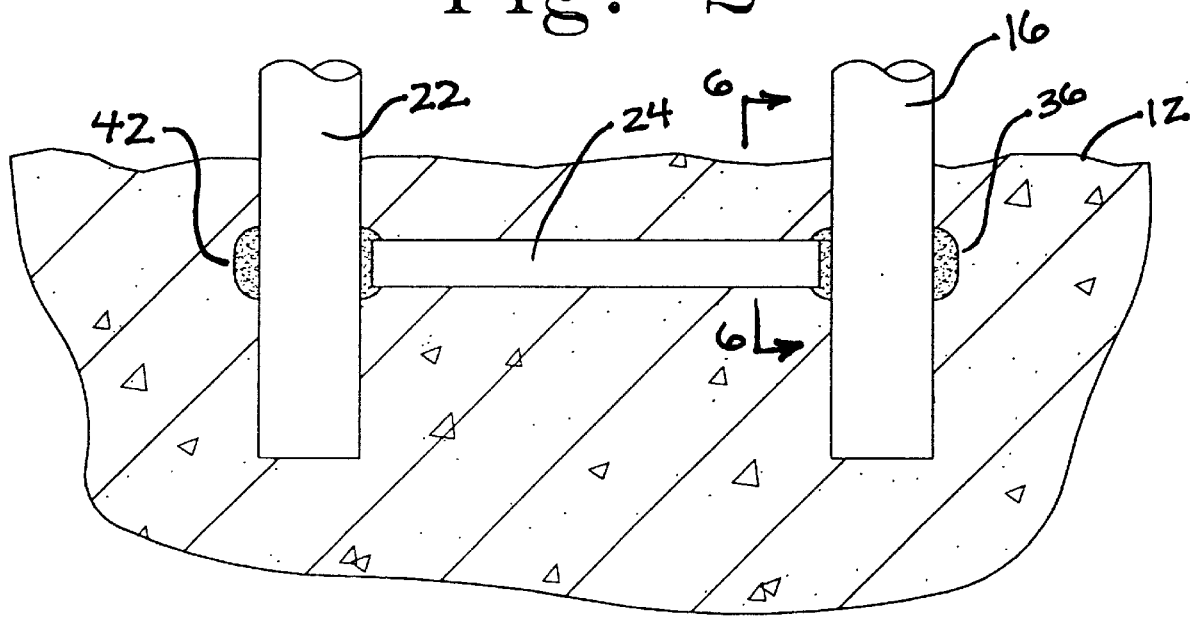
FIG. 3 is a side elevation of one starter tube extending between two ISV machine electrodes, the electrodes and starter tube being buried in a ground region that is shown in cross-section.
Figure 4:
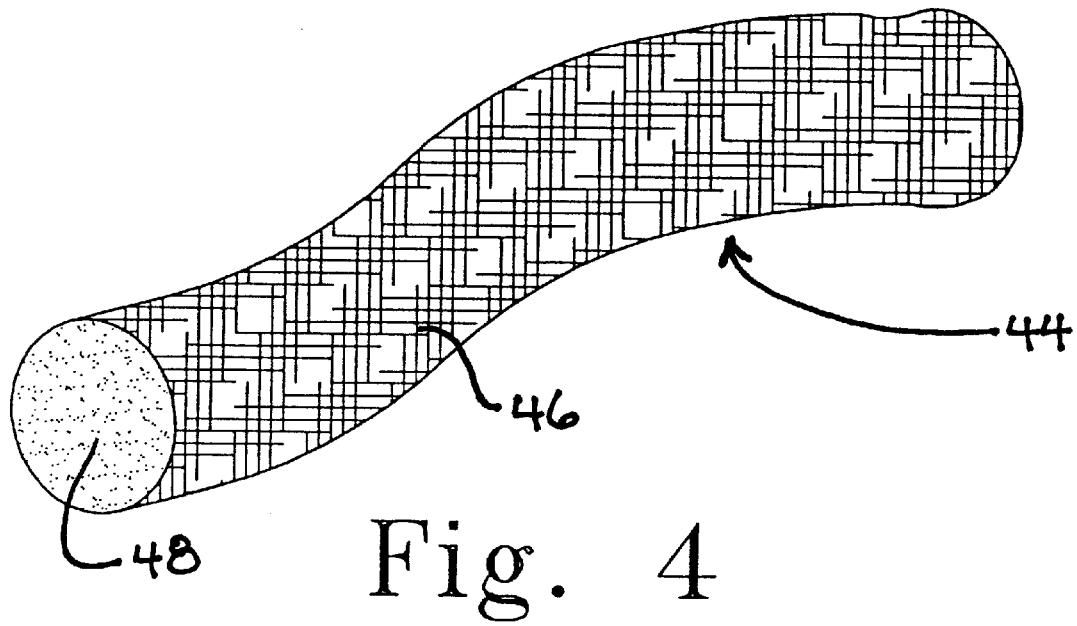
FIG. 4 is a pictorial view of a starter tube constructed in accordance with the invention.
Figure 5:
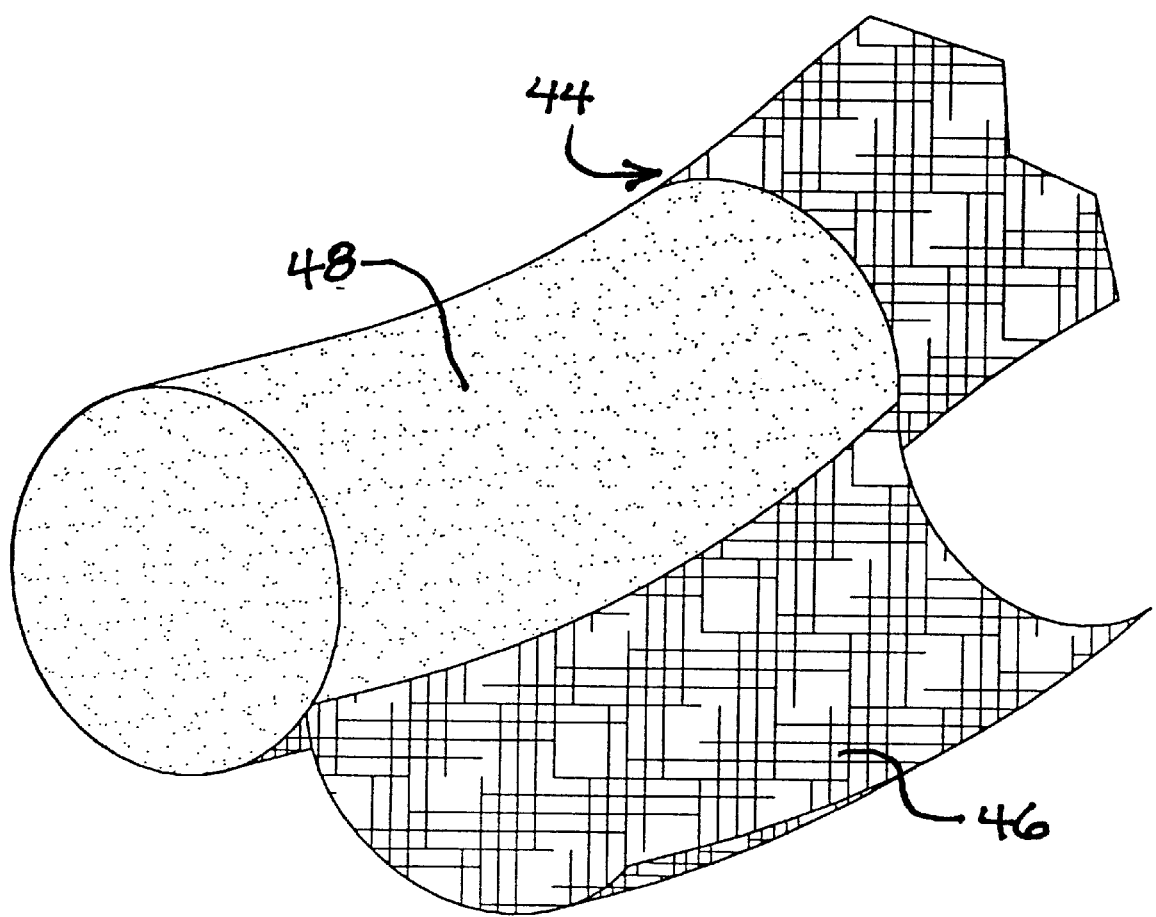
FIG. 5 is an enlarged fragmentary view of the starter tube shown in FIG. 4, with a portion of the tube being peeled back in order to show the starter material held within the tube.
Figure 6:
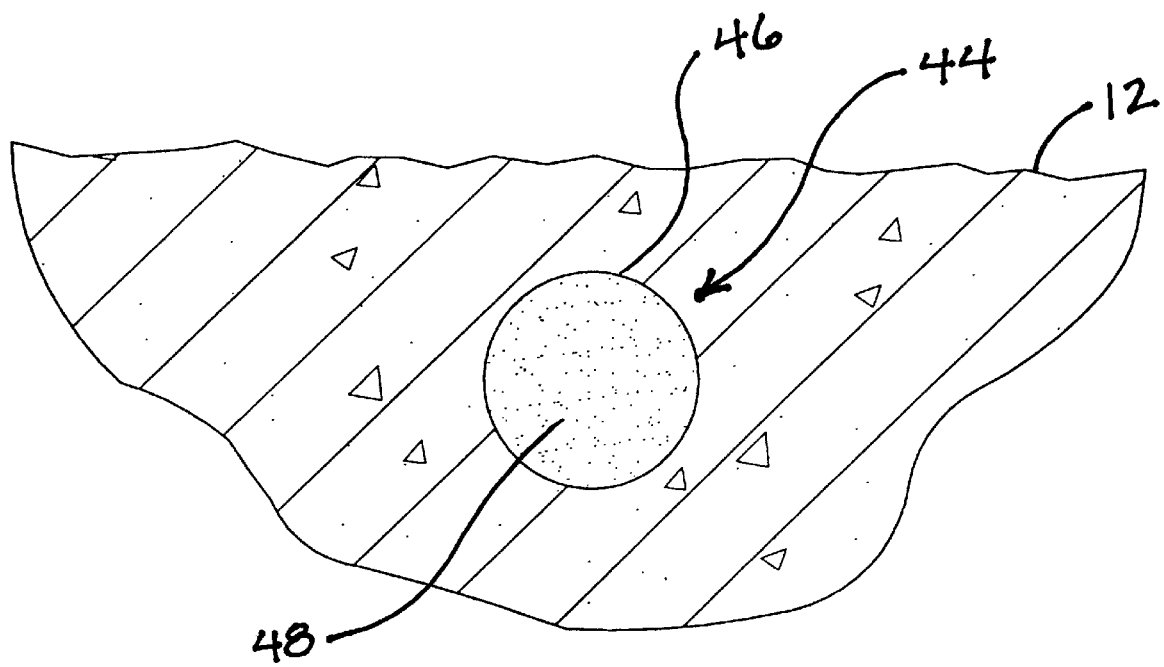
FIG. 6 is a cross-sectional view taken along line 6—6 of FIG. 3.
Figure 7:
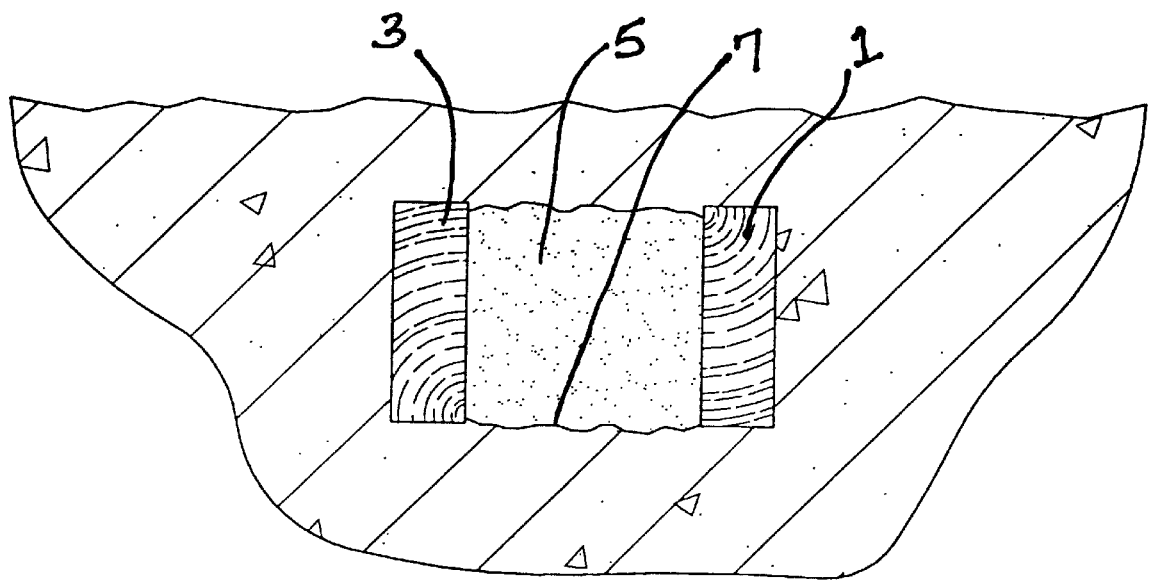
FIG. 7 is a cross-sectional view of what is believed to be the most relevant prior art, and shows a cross-sectional view of a trench and two parallel forms used to position free starter material in the trench.

Directing attention now to FIGS. 4 and 5, shown generally at 44 is a single starter tube which is illustrative of the construction of each starter tube 24, 26, 28, 30, 32, 34 shown in FIGS. 1–3. The starter tube 44 is made of a gas-permeable material 46. One material suitable for use is sold under the trademark SURGITUBE™, which is a medical gauze cloth sold in tubular form. SURGITUBE™ gauze is available from any number of sources, including many pharmacies. Other kinds of fabric or gas-permeable materials could be used as well.

The tube is filled with a loose graphite-glass frit mixture, which is a standard starter material. The ends of the tube 44 may be closed by any suitable means in order to hold the starter material 48 inside the tube prior to use at a vitrification site. Obviously, the length of the tube 44 is a variable, at least when it is constructed. When installed at the vitrification site 12, it is easy to cut to the length desired.

In use, various trenches are dug between the electrodes 16, 18, 20, 22 in accordance with the tube arrangement shown in FIGS. 1 and 2. Each trench is approximately 15 centimeters deep. Each starter tube 24, 26, 28, 30, 32, 34 is laid in each trench and cut to length between the electrodes 16, 18, 20, 22. A certain amount of starter material 48 is positioned around the electrodes, near the ends of the tubes, in order to create a good electrical connection between tube and electrode. After placement of the tubes in the trenches, all are covered with at least a few centimeters of waste material. The fabric 46 and starter material 48 making up each tube are consumed during the vitrification process. When vitrification commences, the electrical heating of the starter material 48 generates gases. These exit the tubes through the gas-permeable fabric 46.

It is estimated that use of the tube 44 reduces the amount of time required to install a vitrification starter path by approximately 80 percent. Additionally, the flexibility of the tube 44 allows the starter path to deviate from straight lines between electrodes, if desired.

It should be appreciated that the tube 44 could be laid at any depth. It is usually placed in the fashion described above. However, if it is desired to initiate vitrification at a deeper depth, the tube 44 could be buried under several feet or more of material.

It is to be understood that the preceding description sets forth the best mode for carrying out the invention as it is presently known. It is conceivable that other embodiments of the invention may be developed in the future. Although use of the invention is described in the context of an ISV machine, it is to be understood that it may be applicable for use in conjunction with other kinds of joule-heated vitrification technologies. Accordingly, the spirit and scope of the invention is not to be limited by the preceding description. Instead, it is to be limited by the following patent claim or claims, the interpretation of which is to be made in accordance with the established doctrines of patent claim interpretation.

What is claimed is:

1. For use in a vitrification process, a method of creating an electrically conductive path between a pair of electrodes, the electrodes being at least partially surrounded by a material to be vitrified, the method comprising:

creating a trench in the material to be vitrified, the trench extending from one electrode to the other;

placing an elongated, electrically conductive, tubular member in the trench, the tubular member extending along substantially the length of the trench and having opposite ends respectively positioned adjacent the electrode at each end of the trench, the tubular member having an elongated, flexible tubular sheath made of a gas permeable fabric, and an electrically conductive material received within and substantially filling the sheath, the material being a loose graphite-glass frit mixture that cannot independently hold a defined shape such that the sheath retains the material and causes the material to define a continuous electrically conductive path;

creating an electrically conductive contact between the electrodes and the ends of the tubular member; and covering the tubular member in the trench.

2. The method of claim 1, wherein the gas-permeable material is made of a gauze fabric.

* * * * *